United States Patent
Wu et al.

(10) Patent No.: US 8,090,058 B2
(45) Date of Patent: Jan. 3, 2012

(54) WIRELESS COMMUNICATION RECEIVING SYSTEM AND APPARATUS AND METHOD FOR DECIDING A TRANSMITTED SIGNAL CORRESPONDING TO A RECEIVED SIGNAL THEREOF

(75) Inventors: Wen-Rong Wu, Hsinchu (TW); Jiun-Ying Wu, Taipei (TW)

(73) Assignee: National Chiao Tung University, Hsinchu (TW)

( * ) Notice: Subject to any disclaimer, the term of this patent is extended or adjusted under 35 U.S.C. 154(b) by 887 days.

(21) Appl. No.: 12/129,927

(22) Filed: May 30, 2008

(65) Prior Publication Data
US 2009/0110090 A1     Apr. 30, 2009

(30) Foreign Application Priority Data
Oct. 29, 2007   (TW) ................ 96140565 A

(51) Int. Cl.
*H04L 27/06* (2006.01)
(52) U.S. Cl. ........................................ 375/340
(58) Field of Classification Search .............. 375/340, 375/260, 261; 370/203
See application file for complete search history.

(56) References Cited

U.S. PATENT DOCUMENTS
2008/0049596 A1 *   2/2008   Khojastepour et al. ....... 370/203
* cited by examiner

*Primary Examiner* — Khai Tran
(74) *Attorney, Agent, or Firm* — Muncy, Geissler, Olds & Lowe, PLLC

(57) ABSTRACT

A wireless communication receiving system and an apparatus and a method for deciding a transmitted signal corresponding to a received signal thereof are provided. The transmitted signal comprises a plurality of sub-transmitted signals. The system selects at least one of the sub-transmitted signals as a reference signal group, wherein each of a plurality of candidate values of the reference signal group forms a candidate geometric space respectively. The received signal is projected to each of the candidate geometric spaces to generate a projection signal respectively. In each of the candidate geometric space, the corresponding projection signal is quantized to generate a quantized projection signal having a projection distance to the corresponding projection signal. Finally, the transmitted signal is decided according the quantized projection signal and the candidate signal value corresponding to the shortest projection distance.

21 Claims, 4 Drawing Sheets

US 8,090,058 B2

WIRELESS COMMUNICATION RECEIVING SYSTEM AND APPARATUS AND METHOD FOR DECIDING A TRANSMITTED SIGNAL CORRESPONDING TO A RECEIVED SIGNAL THEREOF

This application claims the benefit of priority based on Taiwan Patent Application No. 096140565 filed on Oct. 29, 2007 the contents of which are incorporated herein by reference in their entirety.

CROSS-REFERENCES TO RELATED APPLICATIONS

Not applicable.

BACKGROUND OF THE INVENTION

1. Field of the Invention

The present invention provides a wireless communication receiving system and an apparatus and a method for deciding a transmitted signal corresponding to a received signal thereof. More particularly, the present invention provides a Multi-Input Multi-Output (MIMO) wireless communication system, an apparatus, and a method for deciding a transmitted signal corresponding to a received signal thereof.

2. Descriptions of the Related Art

With increased demands for personal communications and the rapid proliferation of multimedia message communications over recent years, the frequency spectrum has become an increasingly valuable resource. Accordingly, improving the communication throughput has become one of the greatest challenges confronted by the wireless communication industry. One of the effective solutions that have been proposed to solve this problem is the Multi-Input Multi-Output (MIMO) technology.

In a MIMO wireless communication system, the transmitting end divides an original transmitted signal into a plurality of sub-transmitted signals according to the number of antennas and transmits the sub-transmitted signals from the transmitting antennas to the receiving antennas at a receiving end through channels. These sub-transmitted signals are then combined again into a received signal by the receiving antennas according to a channel propagation factor. Because the transmitted signal is subject to interference from noise during transmission, differences may exist between the received signal and the transmitted signal. Consequently, how to decide a transmitted signal corresponding to a received signal has become a great concern that many research efforts are directed to in this industry.

One conventional method for deciding a transmitted signal corresponding to a received signal is to make a computation according to the Maximum Likelihood algorithm. In this method, each of the possible candidate transmitted signals is used respectively in the computation, and the one that is computed to be most approximate to the received signal is chosen as the transmitted signal corresponding to the received signal. Although this method may yield a relatively accurate result, it requires a computation on every candidate signal. In the case of a high level quadrature amplitude modulation (QAM), the computational complexity of this method will be undesirably high. For example, in an N by N MIMO wireless communication receiving system, if the QAM has a level of M, the computational complexity will be as high as $O(M^N)$.

Another conventional method for deciding a transmitted signal corresponding to a received signal is to make a computation according to the Sphere Decoding algorithm. In this method, a sphere radius is decided first, and among the candidate transmitted signals within this sphere radius, the one that is computed to be most approximate to received signal is chosen as the transmitted signal corresponding to the received signal. Although this method may reduce the number of candidate signals to be computed, it may be difficult to decide the appropriate sphere radius. Moreover, the corresponding hardware is also difficult to implement.

Accordingly, it is important to provide a method, which has reduced computational complexity and allows for easy hardware implementation, for deciding a transmitted signal corresponding to a received signal in a wireless communication receiving system.

SUMMARY OF THE INVENTION

One objective of this invention is to provide a method for deciding a transmitted signal corresponding to a received signal, wherein the transmitted signal comprises a plurality of sub-transmitted signals. This method decides the transmitted signal with a reduced number of computations, thus reducing the computational complexity and increasing performance of the system.

To this end, the method comprises the steps of: (a) selecting at least one of the sub-transmitted signals as a first reference signal group, wherein the first reference signal group has a plurality of first candidate signal values; (b) deriving a plurality of first projection signal by projecting the received signal onto each of the first candidate geometric spaces respectively; (3) deriving a plurality of first quantization signal by quantizing each of the first projection signals in the corresponding first candidate geometric space, a first projection distance existing between each of the first quantization signals and the corresponding first projection signal; and (4) deciding the transmitted signal by using the first quantization signal that corresponds to the shortest first projection distance and the first candidate signal value that corresponds to the shortest first projection distance.

Another objective of this invention is to provide an apparatus for deciding a transmitted signal corresponding to a received signal, wherein the transmitted signal comprises a plurality of sub-transmitted signals. This apparatus decides the transmitted signal with a reduced number of computations, thus reducing the computational complexity and increasing the operating performance of the system.

The apparatus comprises a selection module, a projection module, a quantization module, and a decision module. The selection module is configured for selecting at least one of the sub-transmitted signals as a first reference signal group, wherein the first reference signal group has a plurality of first candidate signal values, and each of the first candidate signal values forms a first candidate geometric space respectively. The projection module is configured for deriving a plurality of first projection signal by projecting the received signal onto each of the first candidate geometric spaces respectively. The quantization module is configured for deriving a plurality of first quantization signal by quantizing each of the first projection signals in the corresponding first candidate geometric space. The decision module is configured for deciding the transmitted signal by using the first quantization signal that corresponds to the shortest first projection distance and the first candidate signal value that corresponds to the shortest first projection distance.

Yet a further objective of this invention is to provide a receiving system for wireless communication. This receiving system for wireless communication decides the transmitted signal with a reduced number of computations, thus reducing the computational complexity and allowing easy hardware implementation. This system comprises a receiving apparatus and a processor configured for deciding a transmitted signal corresponding to the received signal, and executes the aforesaid method.

In summary, this invention provides a wireless communication receiving system, an apparatus and a method for deciding a transmitted signal corresponding to a received signal thereof. With this invention, the low performance of the prior art due to the excessively high computational complexity is ameliorated. Moreover, this invention allows easy hardware implementation, thus overcoming another shortcoming of the prior art solutions.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Embodiments will be described herein below to explain this invention, which relates to a wireless communication receiving system, an apparatus and a method for deciding a transmitted signal corresponding to a received signal thereof. However, these embodiments are not intended to limit this invention to any specific context, applications, or particular methods described in these embodiments. Therefore, description of these embodiments is only intended to illustrate rather than to limit this invention. It should be noted that in the following embodiments and attached drawings, elements not unrelated to this invention are omitted from depiction.

Figure 1:
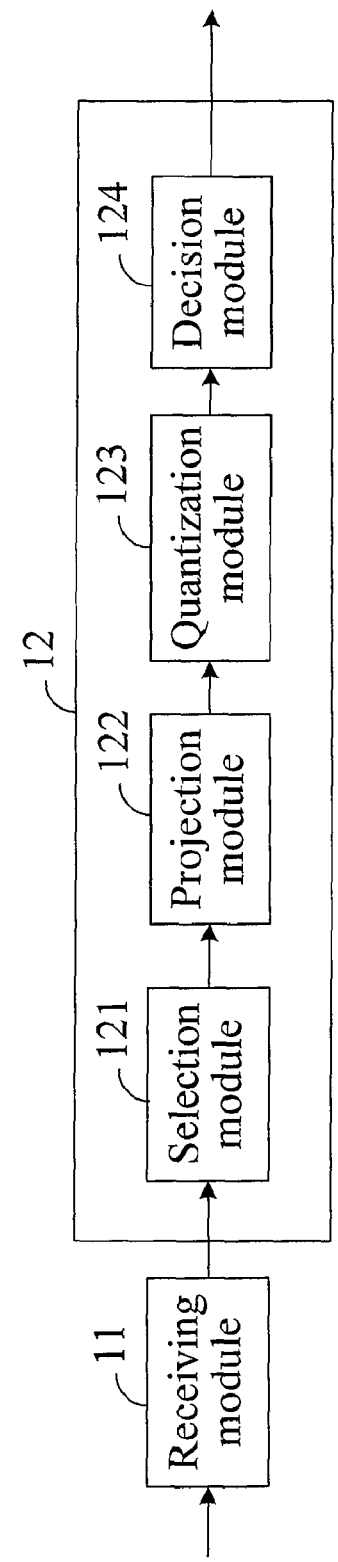
FIG. 1 illustrates a first embodiment of this invention.

FIG. 1 depicts a first embodiment of this invention, which is a wireless communication receiving system 10 adapted for use in a Multi-Input Multi-Output (MIMO) wireless communication system. The wireless communication receiving system 10 comprises a receiving apparatus 11 configured to receive a received signal and a processor 12 configured to decide a transmitted signal corresponding to the received signal. The processor 12 further comprises a selection module 121, a projection module 122, a quantization module 123, and a decision module 124.

In a MIMO wireless communication system, the transmitted signal comprises a plurality of sub-transmitted signal, each of which has been quantized into a corresponding candidate signal value. For example, if these sub-transmitted signals are processed by Pulse Amplitude Modulation (PAM), such as 4-PAM, the candidate signal values will be −3, −1, 1, and 3 respectively. It should be noted that the PAM used here is not intended to limit scope of this invention, and any other processing approaches with a quantization function will be also applicable. Upon being quantized, the plurality of sub-transmitted signals is transmitted from a plurality of transmitting antennas. Then, in response to the received signal, the processor 12 decides the candidate values of the sub-transmitted signals in the corresponding transmitted signal.

Functions of the aforesaid modules will now be described in detail by illustrating operation of the system.

Upon receiving the received signal from the receiving apparatus 11, the selection module 121 selects at least one of the sub-transmitted signals as a first reference signal group. For example, if the MIMO wireless communication system has four transmitting antennas, i.e., the transmitted signal comprises four sub-transmitted signals denoted as x1, x2, x3, and x4 respectively, the selection module 121 may selects one (e.g., x1) or a plurality (e.g., x2 and x3) of the sub-transmitted signals as the first reference signal group.

Additionally, the first reference signal group has a plurality of first candidate signal values, and each of which forms a first candidate geometric space respectively. For example, assuming that the transmitted signal comprises four sub-transmitted signals x1, x2, x3, and x4 which have all been subjected to a 4-PAM processing, i.e., each of the four sub-transmitted signal x1, x2, x3, and x4 has a signal value of one of −3, −1, 1, and 3 respectively. Under this assumption, if the first reference signal group includes a single sub-transmitted signal (e.g., x1), then the first candidate signal values of the first reference signal group are possible values of x1 (i.e., −3, −1, 1 and 3). Each of the first candidate signal values (i.e., −3, −1, 1, and 3) forms a first candidate geometric space (i.e., a line segment) respectively, so that there are four first candidate geometric spaces in total. Alternatively, if the first reference signal group is selected to include more than one sub-transmitted signals (i.e., x2 and x3), then the first candidate signal values of the first reference signal group are possible values of x2 in combination with possible values of x3, i.e., (−3, −3), (−3, −1), (−3, 1), (−3, 3), (−1, −3), (−1, −1), (−1, 1), (−1, 3), (1, −3), (1, −1), (1, 1), (1, 3), (3, −3), (3, −1), (3, 1), and (3, −3), wherein the first digits in the brackets represent possible values of x2 and the second digits represent possible values of x3. Each of the first candidate signal values forms a respective first candidate geometric space (i.e., a two-dimensional space), so there are sixteen geometric spaces in total. Other cases may be deduced in a similar way. For example, the transmitted signal may comprise a different number of sub-transmitted signals, the first reference signal group may include a different number of sub-transmitted signals or different quantization approaches may be employed.

Figure 2:
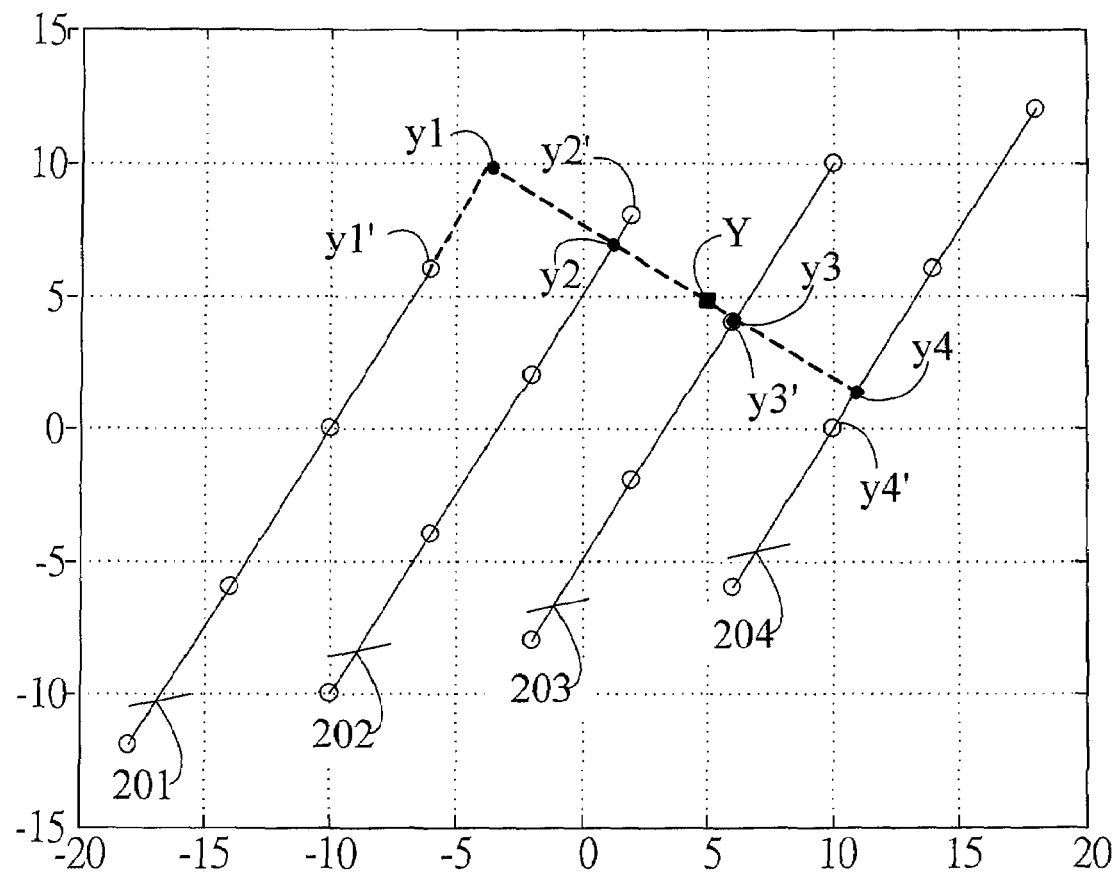
FIG. 2 illustrates a first candidate geometric space.

For sake of convenience, a further description will be made in the context of a 2 by 2 MIMO wireless communication system (i.e., comprising two transmitting antennas and two receiving antennas) and 4-PAM. Sub-transmitted signals of the system are represented by x1 and x2 respectively, and x1 is selected as the first reference signal group. Because x1 has possible values of −3, −1, 1, and 3, the first reference signal group has candidate signal values of −3, −1, 1, and 3 correspondingly. FIG. 2 depicts the first candidate geometric spaces 201, 202, 203, and 204 (i.e., four line segments) formed by the four candidate signal values of −3, −1, 1 and 3 respectively.

Subsequently, the projection module 122 derives a plurality of first projection signal by projecting the received signal onto each of the first candidate geometric spaces to derive the first projection signal respectively. As shown in FIG. 2, the received signal is represented by a dot Y therein. When the received signal Y is projected onto the first candidate geometric spaces 201, 202, 203, and 204 formed by the candidate signal values (i.e., −3, −1, 1, and 3) of the first reference signal group respectively, the first projection signals denoted by y1, y2, y3, and y4 respectively are obtained as depicted in FIG. 2.

Upon generation of the first projection signals y1, y2, y3, and y4, the quantization module 123 derives a plurality of first quantization signal by quantizing each of the first projection signals in the corresponding first candidate geometric space, with a first projection distance existing between each of the first quantization signals and the corresponding first projection signals. Also, shown in FIG. 2, the quantization module 123 quantizes the first projection signals y1, y2, y3, and y4 in the first candidate geometric spaces 201, 202, 203, and 204 to derive the first quantization signals y1' (with a value of 3), y2' (with a value of 3), y3' (with a value of 1), and y4' (with a value of −1) respectively. As depicted, there is a first projection distance between y1 and y1', y2 and y2', y3 and y3', and y4 and y4', respectively.

Finally, the decision module 124 decides the transmitted signal by using the first quantization signal that corresponds to the shortest first projection distance and the first candidate signal value that corresponds to the shortest first projection distance. In more detail, the first quantization signal corresponding to the shortest first projection distance comprises at least one resultant signal value, and the decision module 124 decides that the transmitted signal comprises the resultant signal value and the corresponding first candidate signal value.

As illustrated in FIG. 2 again, the shortest first projection distance occurs between the first projection signal y3 and the first quantization signal y3'. In this case, the corresponding first candidate geometric space 203 is formed by the first candidate signal value of 1, so the corresponding first candidate signal value is 1. On the other hand, the first quantization signal y3' comprises a resultant signal value. Since y3' is projected onto a dot with a value of 1, the resultant signal value is 1, the decision module 124 decides that the transmitted signal comprises the resultant signal value of the corresponding first quantization signal y3' (i.e., y3'=1) and the first candidate signal value of 1. Since x1 has been previously selected as the first reference signal, a value of the sub-transmitted signal x1 is just the first candidate signal value. Meanwhile, a value of the other sub-transmitted signal x2 is decided using the value y3'. As a result, the decision module 124 decides that the transmitted signal is (1, 1).

Additionally, the selection module 121 may further select at least one of the sub-transmitted signals as a second reference signal group, which is different from the first reference signal group. The second reference signal group has a plurality of second candidate signal values, each of which forms a second candidate geometric space respectively. Taking the aforesaid 2 by 2 MIMO system as an example, apart from selecting the sub-transmitted signal x1 as the first reference signal, the selection module 121 may further select the sub-transmitted signal x2 as a second reference signal group. The second reference signal group has a plurality of second candidate signal values, each of which forms a second candidate geometric space respectively.

Once the second reference signal group is selected, the projection module 122 derive a plurality of second projection signal by projecting the received signal onto each of the second candidate geometric spaces respectively. Subsequently, the quantization module 123 derives a plurality of second quantization signal by quantizing each of the second projection signals in the corresponding second candidate geometric space. There is also a distance between each of the second quantization signals and the corresponding second projection signal. The processing operations performed by the selection module 121, the projection module 122, and the quantization module 123 on the second reference signal group are just the same as described above with respect to the first reference signal, and thus will not be described in detail again.

Finally, the decision module 124 further uses the second quantization signal that corresponds to the shortest second projection distance and the second candidate signal value that corresponds to the shortest second projection distance to decide the transmitted signal. In more detail, the decision module 124 selects the shorter one of the shortest first projection distance and the shortest second projection distance to derive a selection result, and then uses one of the first quantization signal and the second quantization signal that corresponds to the selection result and one of the first candidate signal value and the second candidate value that corresponds to the selection result to decide the transmitted signal. That is, once the corresponding shortest projection distances are derived according to the two reference signal groups, the decision module 124 finally decides the transmitted signal by finding out the shorter one of the two shortest projection distances. As a result, the accuracy of the transmitted signal decided in this way can be increased.

It should be noted that this invention is not just limited to selecting two reference signal groups. Rather, more reference signal groups may be selected in the wireless communication receiving system 10, with the number of sub-transmitted signals included in each group not necessarily being the same. In this way, the accuracy of the transmitted signal decided may be further increased.

In the wireless communication receiving system 10 of this embodiment, a reference signal group is selected by the selection module 121, and then processing operations are performed by the projection module 122, the quantization module 123, and the decision module 124 to derive the transmitted signal corresponding to the receiving signal. During this process, only the computations to derive a projection distance in the decision module 124 are necessary. Consequently, this can reduce the computational complexity and increase the performance of the system.

Figure 3:
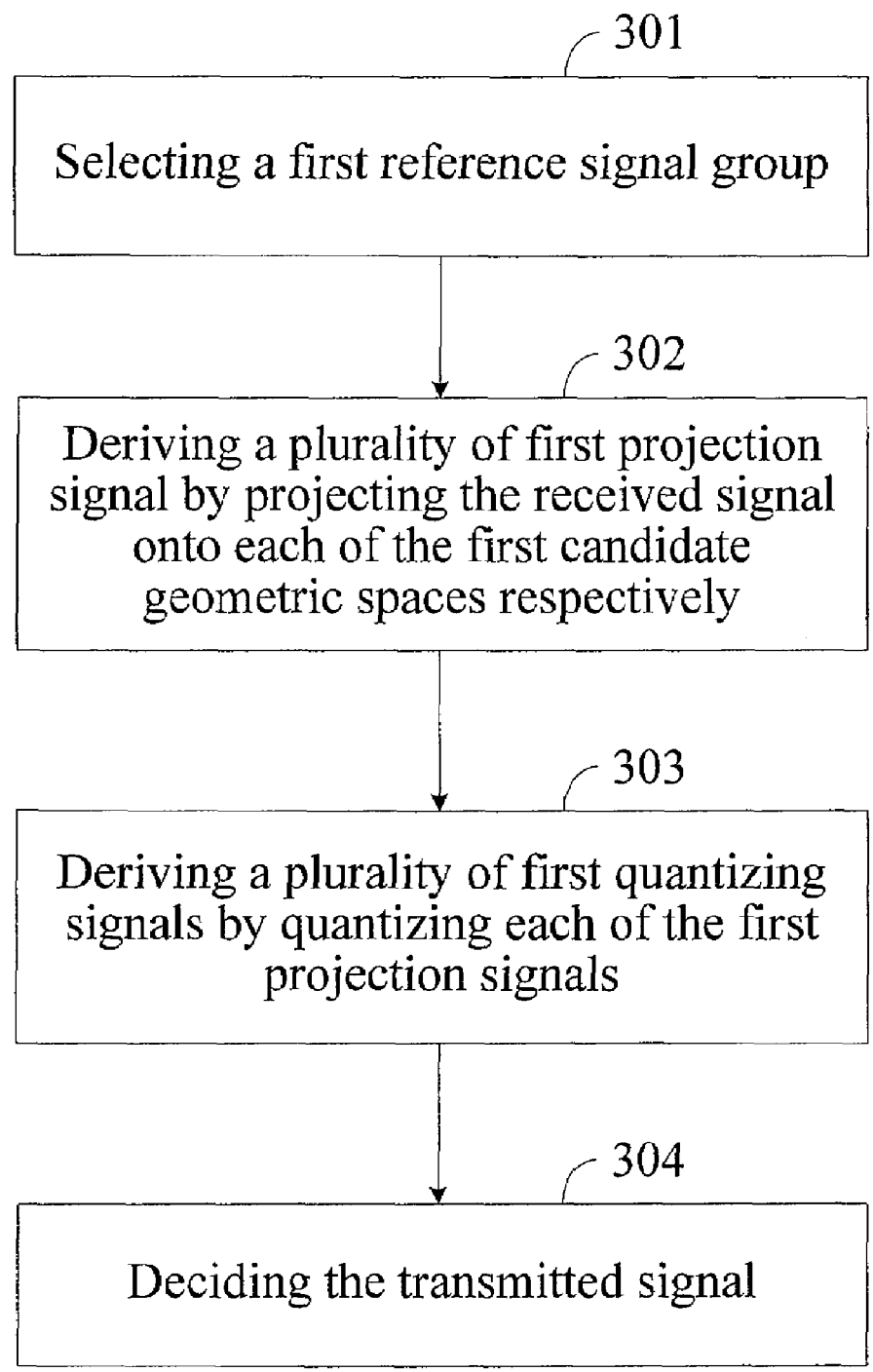
FIG. 3 is a flow diagram of a second embodiment of this invention.

A flow diagram of a second embodiment of this invention is depicted in FIG. 3. The second embodiment is a method for deciding a transmitted signal corresponding to a received signal, wherein the transmitted signal comprises a plurality of sub-transmitted signals. Similarly, this embodiment will be described in the context of a MIMO wireless communication system.

Initially in step 301, at least one of the sub-transmitted signals is selected as a first reference signal group. The first reference signal group has a plurality of first candidate signal values, each of which forms a first candidate geometric space respectively. This step of selecting at least one of the sub-transmitted signals may select a plurality of the sub-transmitted signals. A detailed description thereof is just the same as that of the first embodiment, and thus will not be described again.

In step 302, the method derives a plurality of first projection signal by projecting the received signal onto each of the first candidate geometric spaces respectively. A detailed description thereof is just the same as that of the first embodiment, and thus will not be described again.

Next, in step 303, the method derives a first quantization signal by quantizing each of the first projection signals in the corresponding first candidate geometric space, with a first projection distance between each of the first quantization signals and the corresponding first projection signal. A detailed description thereof is just the same as that of the first embodiment, and thus will not be described again.

Finally, in step 304, the transmitted signal is decided by using the first quantization signal that corresponds to the shortest first projection distance and the first candidate signal value that corresponds to the shortest first projection distance.

The first quantization signal that corresponds to the shortest first projection distance comprises at least one resultant signal value, while the transmitted signal comprises the resultant signal value and the corresponding first candidate signal value.

Figure 4:
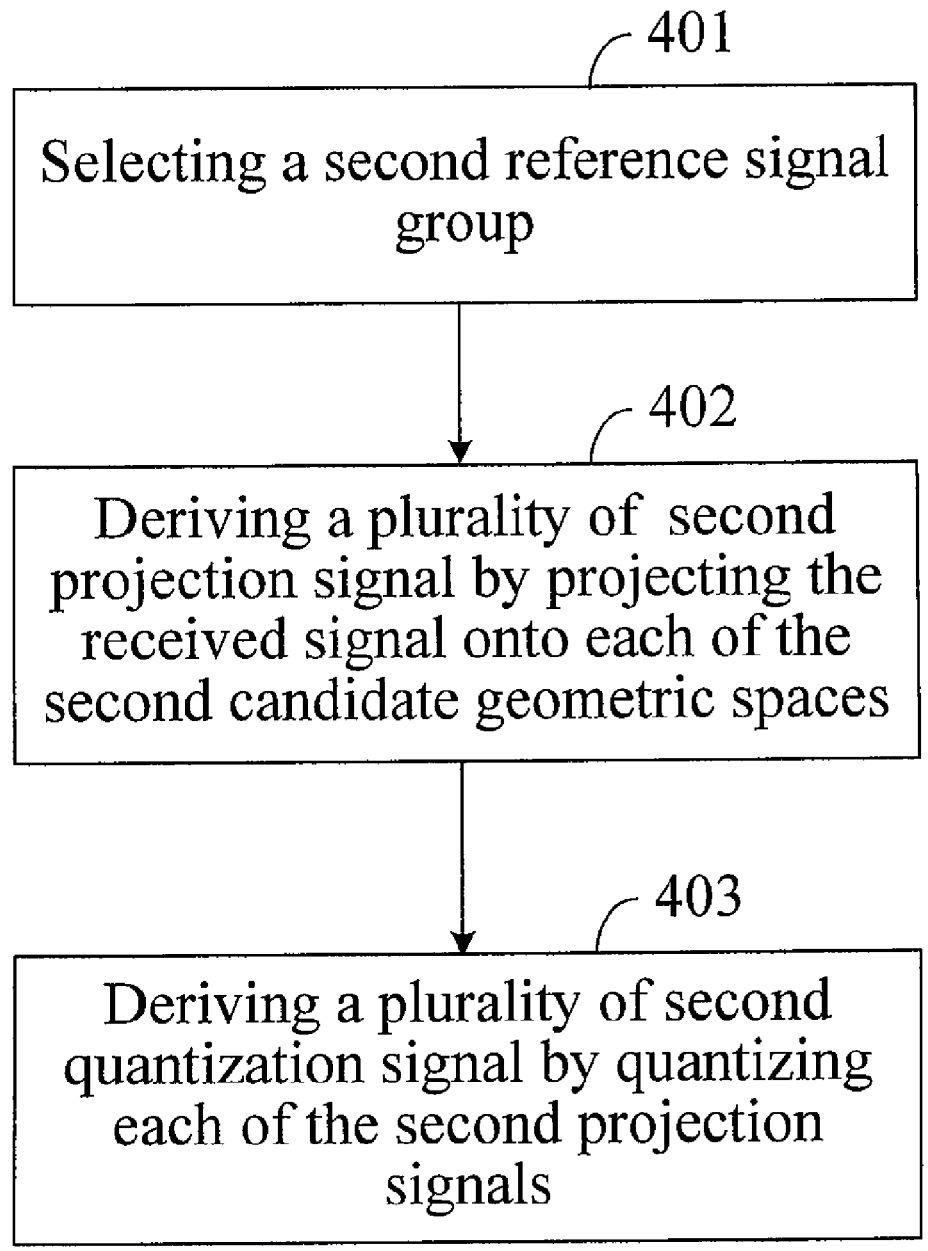
FIG. 4 is a partial flow diagram of the second embodiment of this invention.

In other implementations, this embodiment may also select another group of sub-transmitted signals as a second reference signal group prior to step 304. As shown in FIG. 4, initially in step 401, at least one of the sub-transmitted signals is selected as a second reference signal group which is different from the first reference signal group. The second reference signal group has a plurality of second candidate signal values, each of which forms a second candidate geometric space respectively.

Then, in step 402, the method derives a second projection signal by projecting the received signal onto each of the second candidate geometric spaces respectively.

Next in step 403, the method derives a second quantization signal by quantizing each of the second projection signals in the corresponding second candidate geometric space, with a second projection distance between each of the second quantization signals and the corresponding second projection signal. Subsequent to step 403, the process proceeds to step 304. In this case, in addition to the first quantization signal corresponding to the shortest first projection distance and the first candidate signal value corresponding to the shortest first projection distance, both the second quantization signal corresponding to the shortest second projection distance and the second candidate signal value corresponding to the shortest second projection distance are further used to decide the transmitted signal in step 304.

In particular, in step 304, the shorter one of the shortest first projection distance and the shortest second projection distance is selected to derive a selection result. One of the first quantization signal and the second quantization signal that corresponds to the selection result and one of the first candidate signal value and the second candidate value that corresponds to the selection result are used to decide the transmitted signal.

In addition to the above steps, the second embodiment may also execute all the operations and functions of the first embodiment. The corresponding operations and functions of the second embodiment will readily occur to those of ordinary skill in the art upon reviewing related description of the first embodiment, and hence will not be described in detail herein.

According to the method for deciding a transmitted signal corresponding to a received signal of this embodiment, the number of required computations is reduced by performing a projection and a quantization operation based on the reference signal group selected. In this way, the computational complexity is reduced, thereby increasing the performance of the system.

In summary, this invention provides a wireless communication receiving system, an apparatus and a method for deciding a transmitted signal corresponding to a received signal thereof. By selecting a reference signal, this invention can reduce the number of computations needed to decide a transmitted signal. For example, in an N by N MIMO wireless communication receiving system, if the PAM has a level of M, the conventional Maximum Likelihood algorithm presents a computational complexity of $O(M^N)$. In contrast, the computational complexity of this invention is $O(M)$ or $O(M^2)$. As a result, the shortcoming of the conventional method attributable to an excessively high computational complexity is overcome. Furthermore, as compared with the conventional Sphere Decoding algorithm, this invention also eliminates the difficulty in hardware implementation.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above description, they have substantially been covered in the following claims as appended.

What is claimed is:

1. A method for use in a processor for deciding a transmitted signal corresponding to a received signal, the transmitted signal comprising a plurality of sub-transmitted signals, the method comprising the steps of:
   selecting at least one of the sub-transmitted signals as a first reference signal group by a selection module of the processor, the first reference signal group having a plurality of first candidate signal values, and each of the first candidate signal values forming a first candidate geometric space respectively;
   deriving a plurality of first projection signals by projecting the received signal onto each of the first candidate geometric spaces respectively by a projection module of the processor;
   deriving a plurality of first quantization signals by quantizing each of the first projection signals in the corresponding first candidate geometric space by a quantization module of the processor, a first projection distance existing between each of the first quantization signals and the corresponding first projection signal; and
   deciding the transmitted signal by using the first quantization signal that corresponds to the shortest first projection distance and the first candidate signal value that corresponds to the shortest first projection distance by a decision module of the processor.

2. The method of claim 1, further comprising the steps of:
   selecting at least one of the sub-transmitted signals as a second reference signal group by the selection module of the processor, the second reference signal group being different from the first reference signal group, the second reference signal group having a plurality of second candidate signal values, and each of the second candidate signal values forming a second candidate geometric space respectively;
   deriving a plurality of second projection signals by projecting the received signal onto each of the second candidate geometric spaces respectively by the projection module of the processor; and
   deriving a plurality of second quantization signals by quantizing each of the second projection signals in the corresponding second candidate geometric space by the quantization module of the processor, a second projection distance existing between each of the second quantization signals and the corresponding second projection signal;
   wherein the deciding step further uses the second quantization signal that corresponds to the shortest second projection distance and the second candidate signal value that corresponds to the shortest second projection distance by the decision module of the processor to decide the transmitted signal.

3. The method of claim 1, wherein the step of selecting at least one of the sub-transmitted signals selects a plurality of the sub-transmitted signals.

4. The method of claim 2, wherein the step of selecting at least one of the sub-transmitted signals as the first second reference signal group selects a plurality of the sub-transmitted signals.

5. The method of claim 4, wherein the step of selecting at least one of the sub-transmitted signals as the second reference signal group selects a plurality of the sub-transmitted signals.

6. The method of claim 2, further comprising the step of:
selecting the shorter one of the shortest first projection distance and the shortest second projection distance by the decision module of the processor to derive a selection result;
wherein the deciding step further uses one of the first quantization signal and the second quantization signal that corresponds to the selection result and one of the first candidate signal value and the second candidate signal value that corresponds to the selection result to decide the transmitted signal.

7. The method of claim 1, wherein the first quantization signal that corresponds to the shortest first projection distance comprises at least one resultant signal value, and the transmitted signal comprises the resultant signal value and the corresponding first candidate signal value.

8. An apparatus for deciding a transmitted signal corresponding to a received signal, the transmitted signal comprising a plurality of sub-transmitted signals, the apparatus comprising:
a selection module, configured for selecting at least one of the sub-transmitted signals as a first reference signal group, the first reference signal group having a plurality of first candidate signal values, and each of the first candidate signal values forming a first candidate geometric space respectively;
a projection module, configured for deriving a plurality of first projection signals by projecting the received signal onto each of the first candidate geometric spaces respectively;
a quantization module, configured for deriving a plurality of first quantization signals by quantizing each of the first projection signals in the corresponding first candidate geometric space, a first projection distance existing between each of the first quantization signals and the corresponding first projection signal; and
a decision module, configured for deciding the transmitted signal by using the first quantization signal that corresponds to the shortest first projection distance and the first candidate signal value that corresponds to the shortest first projection distance.

9. The apparatus of claim 8, wherein :
the selection module is further configured for selecting at least one of the sub-transmitted signals as a second reference signal group, the second reference signal group is different from the first reference signal group, the second reference signal group has a plurality of second candidate signal values, and each of the second candidate signal values forms a second candidate geometric space respectively;
the projection module is further configured for deriving a plurality of second projection signals by projecting the received signal onto each of the second candidate geometric spaces respectively;
the quantization module is further configured for deriving a plurality of second quantization signals by quantizing each of the second projection signals in the corresponding second candidate geometric space, and a second projection distance exists between each of the second quantization signals and the corresponding second projection signal; and
the decision module further uses the second quantization signal that corresponds to the shortest second projection distance and the second candidate signal value that corresponds to the shortest second projection distance to decide the transmitted signal.

10. The apparatus of claim 8, wherein the at least one of the sub-transmitted signals selected by the selection module comprise a plurality of the sub-transmitted signals.

11. The apparatus of claim 9, wherein the at least one of the sub-transmitted signals selected by the selection module as the first reference signal group comprise a plurality of the sub-transmitted signals.

12. The apparatus of claim 11, wherein the at least one of the sub-transmitted signals selected by the selection module as the second reference signal group comprise a plurality of the sub-transmitted signals.

13. The apparatus of claim 9, wherein the decision module is further configured for selecting the shorter one of the shortest first projection distance and the shortest second projection distance to derive a selection result, and the decision module further uses one of the first quantization signal and the second quantization signal that corresponds to the selection result and one of the first candidate signal value and the second candidate signal value that corresponds to the selection result to decide the transmitted signal.

14. The apparatus of claim 8, wherein the first quantization signal that corresponds to the shortest first projection distance comprises at least one resultant signal value, and the transmitted signal comprises the resultant signal value and the corresponding first candidate signal value.

15. A receiving system for wireless communication, comprising:
a receiving apparatus, configured for receiving a received signal;
a processor, configured for deciding a transmitted signal corresponding to the received signal, the processor comprising:
a selection module, configured for selecting at least one of the sub-transmitted signals as a first reference signal group, the first reference signal group having a plurality of first candidate signal values, and each of the first candidate signal values forming a first candidate geometric space respectively;
a projection module, configured for deriving a plurality of first projection signals by projecting the received signal onto each of the first candidate geometric spaces respectively;
a quantization module, configured for deriving a first quantization signal by quantizing each of the first projection signals in the corresponding first candidate geometric space, a first projection distance existing between each of the first quantization signals and the corresponding first projection signal; and
a decision module, configured for deciding the transmitted signal by using the first quantization signal that corresponds to the shortest first projection distance and the first candidate signal value that corresponds to the shortest first projection distance.

16. The receiving system of claim 15, wherein:
the selection module is further configured for selecting at least one of the sub-transmitted signals as a second reference signal group, the second reference signal group is different from the first reference signal group, the second reference signal group has a plurality of second candidate signal values, and each of the second candidate signal values forms a second candidate geometric space respectively;

the projection module is further configured for deriving a plurality of second projection signals by projecting the received signal onto each of the second candidate geometric spaces respectively;

the quantization module is further configured for deriving a plurality of second quantization signals by quantizing each of the second projection signals in the corresponding second candidate geometric space, and a second projection distance exists between each of the second quantization signals and the corresponding second projection signal; and the decision module further uses the second quantization signal that corresponds to the shortest second projection distance and the second candidate signal value that corresponds to the shortest second projection distance to decide the transmitted signal.

17. The receiving system of claim 15, wherein the at least one of the sub-transmitted signals selected by the selection module comprise a plurality of the sub-transmitted signals.

18. The receiving system of claim 16, wherein the at least one of the sub-transmitted signals selected by the selection module as the first reference signal group comprise a plurality of the sub-transmitted signals.

19. The receiving system of claim 18, wherein the at least one of the sub-transmitted signals selected by the selection module as the second reference signal group comprise a plurality of the sub-transmitted signals.

20. The receiving system of claim 16, wherein the decision module is further configured for selecting the shorter one of the shortest first projection distance and the shortest second projection distances to derive a selection result, and the decision module further uses one of the first quantization signal and the second quantization signal that corresponds to the selection result and one of the first candidate signal value and the second candidate signal value that corresponds to the selection result to decide the transmitted signal.

21. The receiving system of claim 15, wherein the first quantization signal that corresponds to the shortest first projection distance comprises at least one resultant signal value, and the transmitted signal comprises the resultant signal value and the corresponding first candidate signal value.

* * * * *